(12) United States Patent
Erlandson

(10) Patent No.: US 10,053,160 B2
(45) Date of Patent: Aug. 21, 2018

(54) FOLDABLE, AERODYNAMIC COVER FOR PICKUP TRUCK BED

(71) Applicant: Lars Erlandson, Littleton, CO (US)

(72) Inventor: Lars Erlandson, Littleton, CO (US)

(73) Assignee: Lars Erlandson, Littleton, CO (US)

( * ) Notice: Subject to any disclaimer, the term of this patent is extended or adjusted under 35 U.S.C. 154(b) by 0 days.

(21) Appl. No.: 15/396,617

(22) Filed: Dec. 31, 2016

(65) Prior Publication Data

US 2017/0210430 A1 Jul. 27, 2017

Related U.S. Application Data

(60) Provisional application No. 62/276,929, filed on Jan. 10, 2016.

(51) Int. Cl.
| | | |
|---|---|---|
| *B60J 7/10* | (2006.01) | |
| *B60J 7/12* | (2006.01) | |
| *B62D 35/00* | (2006.01) | |

(52) U.S. Cl.
CPC .............. *B62D 35/00* (2013.01); *B60J 7/102* (2013.01); *B60J 7/12* (2013.01)

(58) Field of Classification Search
CPC ...... B60J 7/102; B60J 7/10; B60J 7/12; B60P 7/02; B60P 7/04; B62D 35/00
USPC ........................... 296/100.14, 100.17, 100.18
See application file for complete search history.

(56) References Cited

U.S. PATENT DOCUMENTS

| | | | | | |
|---|---|---|---|---|---|
| 3,773,379 | A | * | 11/1973 | Loiseau ................... | B60P 7/02 135/119 |
| 4,061,394 | A | * | 12/1977 | Vodin ....................... | B60J 7/104 296/100.16 |
| 4,310,194 | A | * | 1/1982 | Biller ....................... | B60P 3/32 135/88.13 |
| 4,496,184 | A | * | 1/1985 | Byrd ........................ | B60P 7/02 135/88.09 |
| 4,738,274 | A | * | 4/1988 | Heath ...................... | B60P 7/02 135/121 |
| 4,964,669 | A | * | 10/1990 | Geier ..................... | B60J 7/1265 135/88.09 |
| 5,238,288 | A | * | 8/1993 | Chandler ................ | B60J 7/104 135/129 |
| 5,335,960 | A | * | 8/1994 | Benignu, Jr. ........... | B60P 3/341 135/88.05 |
| 5,385,377 | A | * | 1/1995 | Girard ..................... | B60J 7/104 296/100.16 |
| 5,556,156 | A | * | 9/1996 | Kirk ........................ | B60J 7/102 135/88.05 |
| 7,147,265 | B1 | * | 12/2006 | Schmeichel ............ | B60J 7/102 296/100.14 |

(Continued)

FOREIGN PATENT DOCUMENTS

WO    WO 88/07943    * 10/1988 .............. B60J 7/102

*Primary Examiner* — Gregory A Blankenship

(57) ABSTRACT

A foldable, aerodynamic cover assembly for pickup truck beds which is user switchable between a closed aerodynamic configuration and a folded open configuration which allows the user access to the pickup truck bed. The aerodynamic configuration reduces vehicle wind resistance and drag, which increases fuel efficiency. The foldable, aerodynamic cover is comprised of a rigid folding frame with an outer cover. The outer cover is disposed over the frame and detachably connected to the base portion of said frame.

5 Claims, 10 Drawing Sheets

(56) References Cited

U.S. PATENT DOCUMENTS

| | | | |
|---|---|---|---|
| 8,182,020 B2* | 5/2012 | Herndon | B62D 35/001 296/100.06 |
| 2009/0256382 A1* | 10/2009 | Stum | B60J 7/1621 296/100.07 |
| 2010/0045069 A1 | 2/2010 | Koba | |
| 2010/0148534 A1* | 6/2010 | Kneifl | B60J 7/1278 296/183.1 |
| 2010/0320798 A1* | 12/2010 | Huotari | B60J 7/12 296/100.17 |
| 2012/0098292 A1* | 4/2012 | Huotari | B60J 7/10 296/100.09 |
| 2014/0117702 A1* | 5/2014 | Rossi | B60J 7/102 296/100.14 |
| 2017/0210430 A1* | 7/2017 | Erlandson | B60J 7/102 |

* cited by examiner

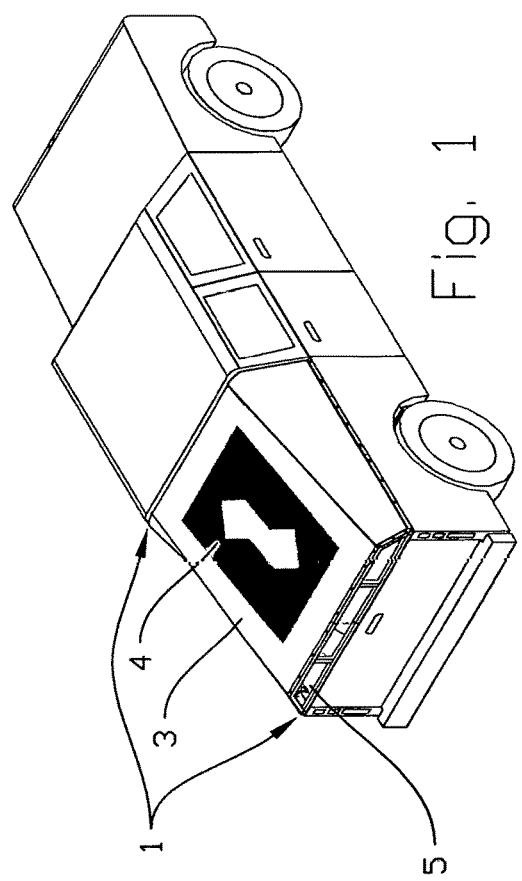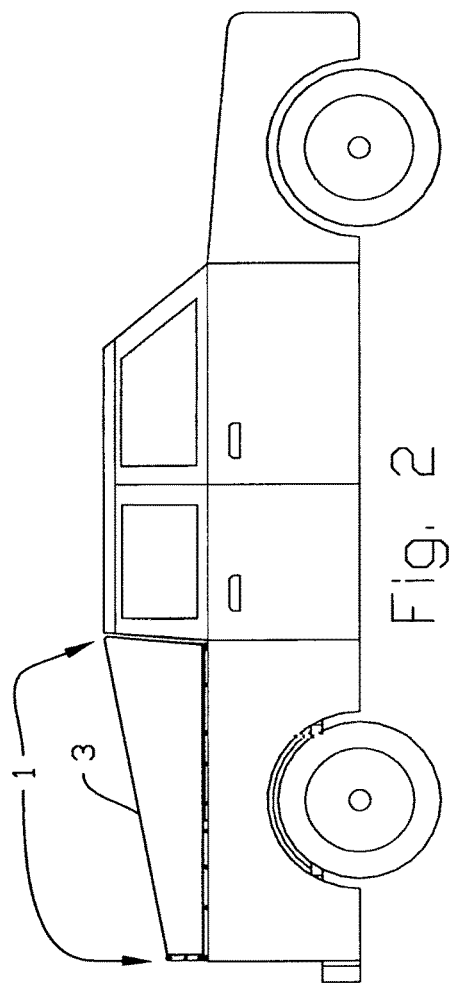

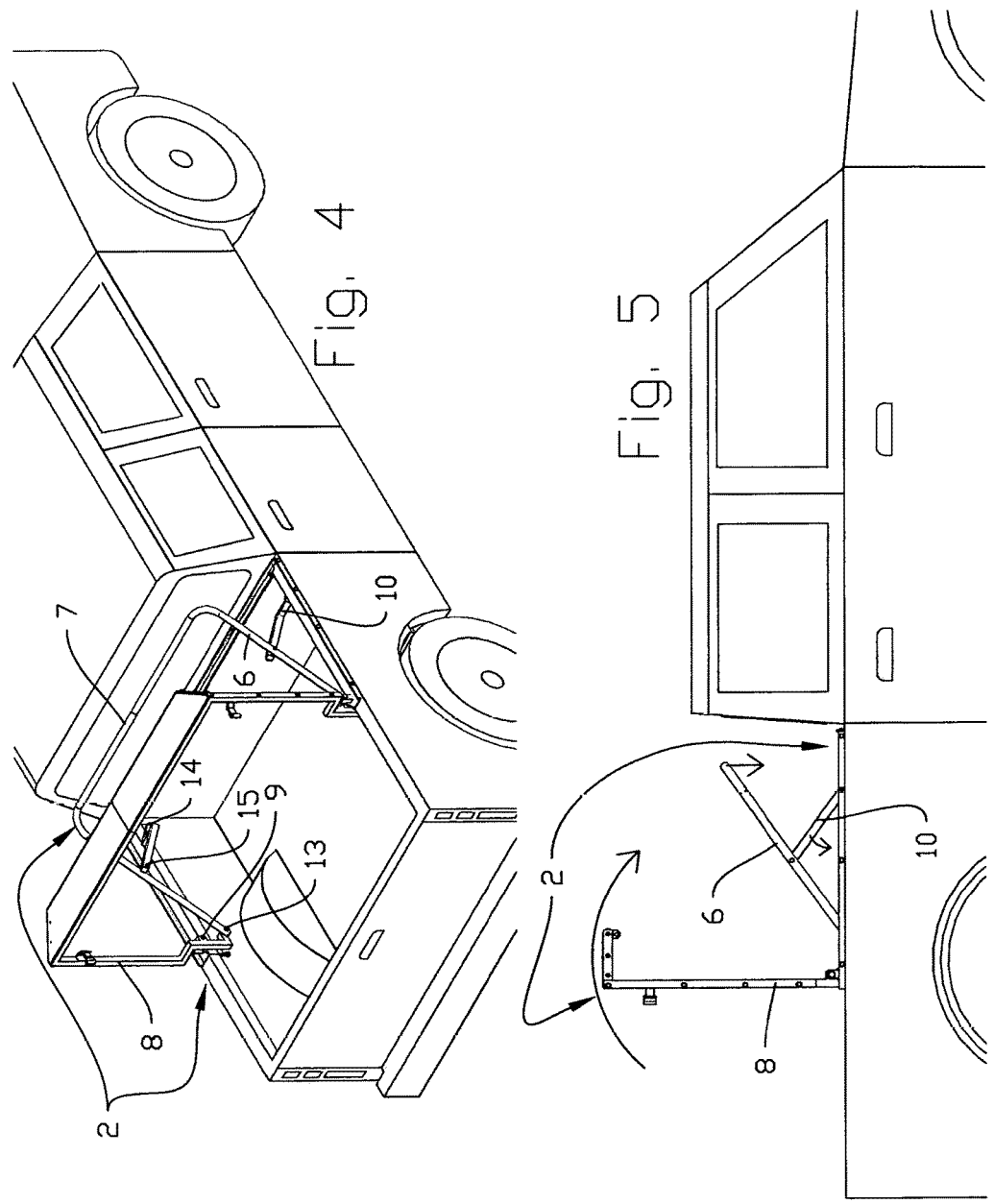

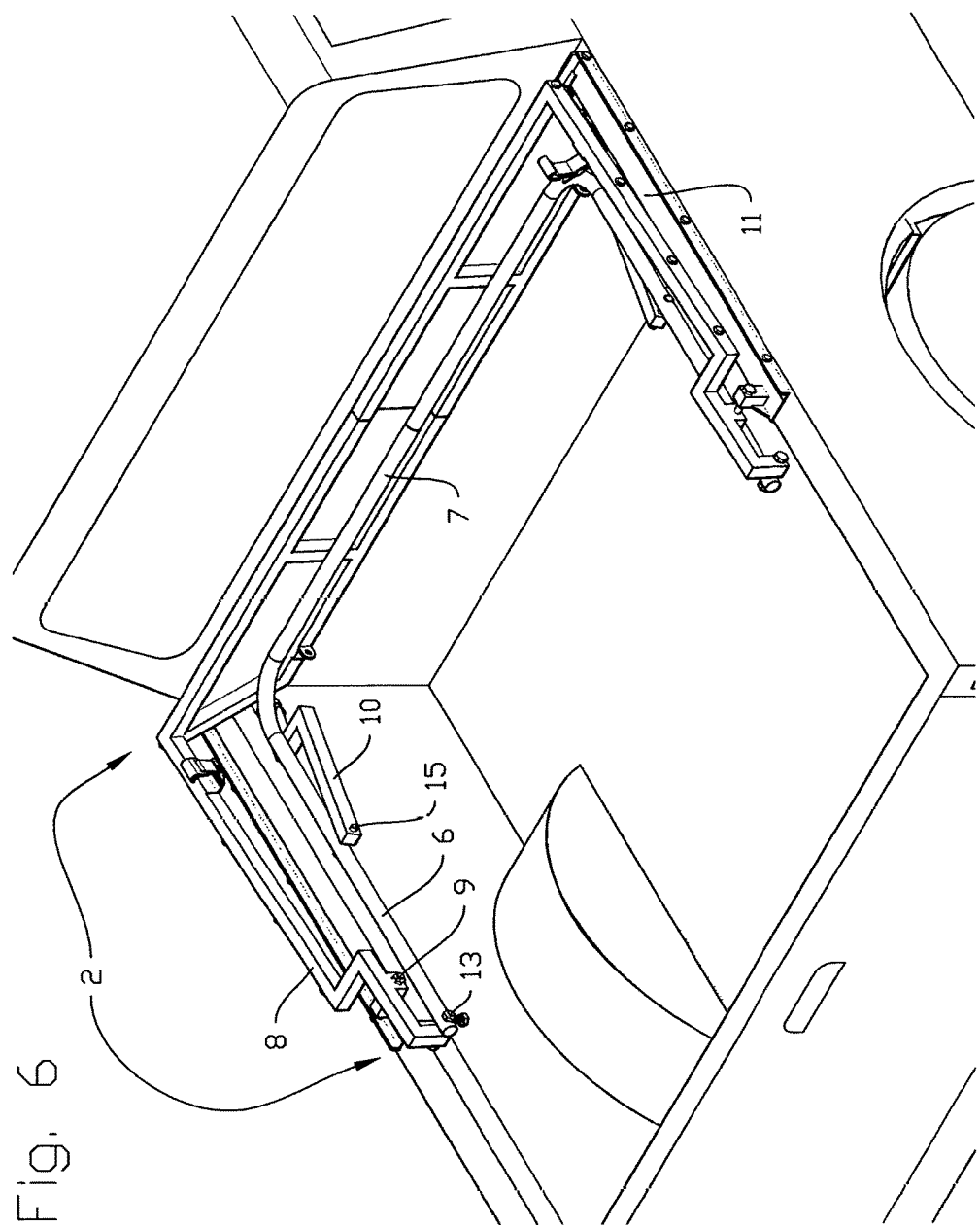

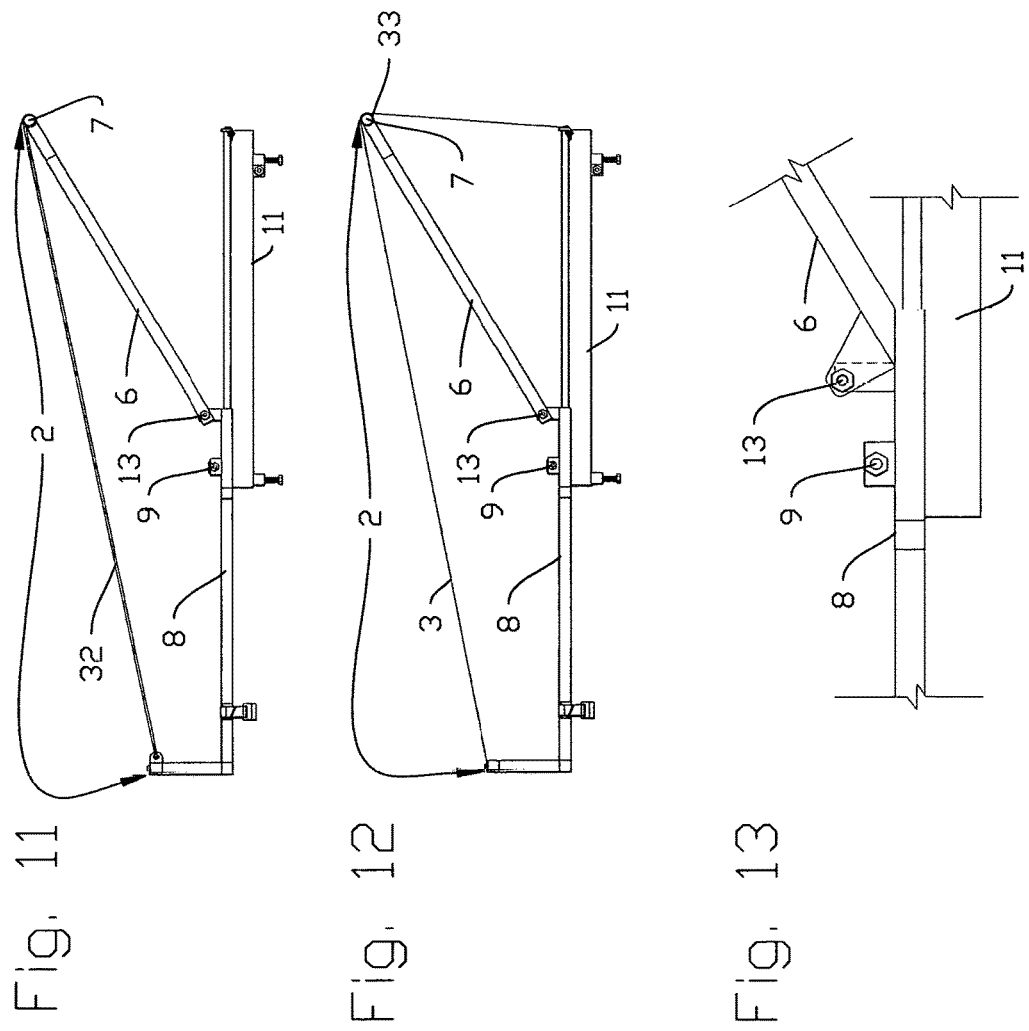

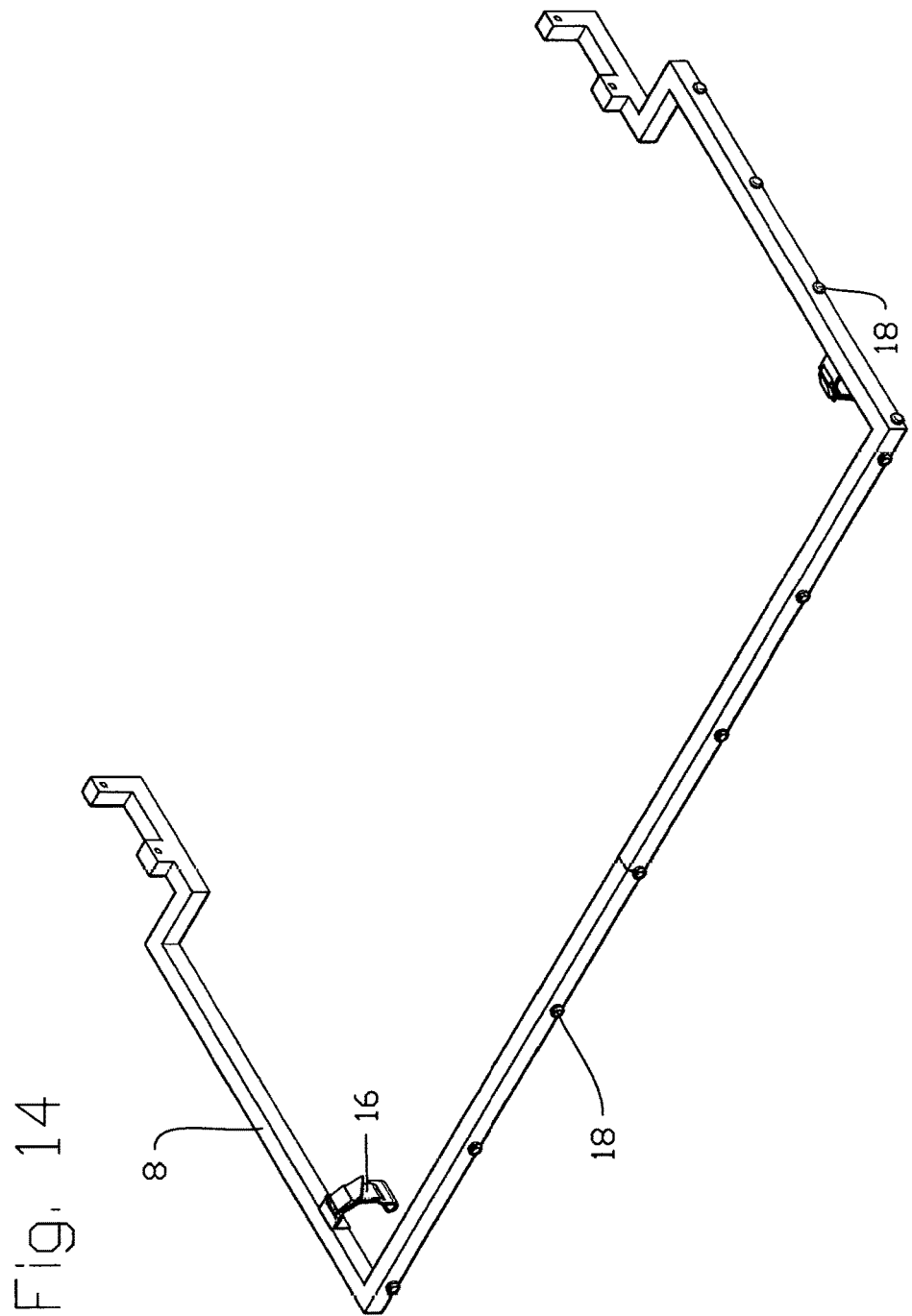

FOLDABLE, AERODYNAMIC COVER FOR PICKUP TRUCK BED

CROSS-REFERENCE TO RELATED APPLICATIONS

This application claims the benefits of provisional patent application Ser. No. U.S. 62/276,929, filed 2016 Jan. 10 by the present inventor.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND

Field of Invention

This invention relates to the field of cover assemblies for pickup trucks. More particularly, this invention relates to an aerodynamic cover assembly for pickup truck beds that is easily transformable between open and closed configurations. Known prior art relevant to this invention can be found in U.S. Patent Class 296, subclasses 100 and 165.

Description of Related Art

Pickup trucks are popular vehicles in part because of their ability to haul cargo in the open bed located behind the pickup truck's cab. One of the disadvantages of a pickup truck's open bed is that it creates aerodynamic drag which, in turn, decreases the fuel efficiency of the pickup truck. Many pickup truck owners desire to cover the open bed of their pickup truck to protect their cargo from exposure to the elements and theft. For years, a popular method of covering a pickup truck bed has been to install a raised pickup truck bed cover, which is typically rectangular in shape. The rectangular shape of these raised bed covers offer little, if any, reduction in aerodynamic drag and in some cases can increase aerodynamic drag, which can decrease the fuel efficiency of the pickup truck. Currently known rectangular raised bed covers are either rigid shells, or comprised of a flexible outer covering over a rigid frame.

To reduce aerodynamic drag and increase fuel efficiency, some pickup truck owners elect to install an aerodynamic cover over the pickup truck bed. The currently known aerodynamic covers are either made of rigid materials or a flexible material over a frame that does not fold. These aerodynamic covers have a roof which begins at a height in approximation with the roof of the pickup truck cab and then tapers downwards towards the pickup trucks tailgate. These aerodynamic covers also have sides that may taper inwards towards the centerline of the pickup truck. This tapered shape provides less aerodynamic drag than a traditional rectangular pickup truck cover. The greatest benefit of an aerodynamic pickup truck cover is an increase in the fuel efficiency of the pickup truck. However, there are several disadvantages. Because of the tapered shape and the non-foldability of the current known aerodynamic pickup truck covers, there is a loss of interior volume that can only be remedied by fully removing the cover. Additionally, the rigid aerodynamic pickup truck cover is fairly heavy which can reduce the fuel efficiency of the host pickup truck and also makes the cover difficult to install and remove. While the currently know aerodynamic covers made of flexible materials weigh less, they are not foldable and, thus, the cover must be manually and fully disassembled to allow large cargo to be loaded into the pickup truck bed.

U.S. Pat. No. 4,964,669A to Geier (1989) and U.S. Pat. No. 7,147,265B1 to Schmeichel (2005) both show foldable pickup truck covers which have a rigid foldable frame with a flexible outer covering. Both of these designs have a traditional rectangular shape, rather than a tapered aerodynamic shape. In most cases, this rectangular shape will not reduce the aerodynamic drag of a vehicle they are mounted on and in some cases they will increase the aerodynamic drag of the host vehicle. These two covers lack the design which would allow an aerodynamic shape to be created and easily folded. Furthermore, these two pickup truck covers lack the linkages to bring the top of crossbar close to the truck cab when the cover is closed. This creates a large gap between the pickup truck cover and pickup truck cab, which further decreases aerodynamic efficiency. Additionally, because these covers lack a split front frame/rear frame design, the outer covering must be detached from the side bed frame before the frame can be folded into an open position.

Several types of rigid aerodynamic pickup truck covers have been proposed—for example U.S. Pat. No. US20100045069A1 to Koba (2008) and U.S. Pat. No. US20090256382A1 to Stum (2008) and U.S. Pat. No. 8,282,020B2 to Herndon (2007) show tapered, aerodynamic pickup truck covers. Since these covers are made out of rigid materials, they are known to suffer from a number of disadvantages:

a) A truck cover fabricated from rigid materials is heavy and difficult to mount and remove from a pickup truck bed.
b) It is generally more expensive to fabricate a truck cover from rigid materials.
c) A truck cover fabricated from rigid materials is heavy and the weight will negatively impact the fuel efficiency of the vehicle it is mounted upon.
d) Since the rigid truck cover cannot be broken down it is expensive to ship.
e) A truck cover fabricated from rigid material limits the height of cargo that can be placed in the pickup truck bed without completely removing the cover from the truck.

U.S. Pat. No. 5,335,960A to Benignu (1992) and U.S. Pat. No. 4,496,184A to Byrd (1983) both show tapered truck covers consisting of a rigid frame with a flexible outer covering. Neither of these two covers are able to quickly and easily fold into an open position, which limits access to the pickup truck bed. If large cargo needs to be loaded into the bed of the pickup truck, these covers need to be disassembled.

BRIEF SUMMARY OF THE INVENTION

In accordance with one embodiment, a foldable aerodynamic cover for pickup truck bed comprising an outer covering and a means for creating a folding frame, which supports said outer covering into an aerodynamic shape. The foldable aerodynamic cover for a pickup truck bed preferably has a tapered shape that minimizes wind resistance. Using such a shape for a pickup truck bed cover reduces aerodynamic drag and improves fuel efficiency. The reduction in aerodynamic drag comes due to improved pattern of airflow and elimination of complex vortices forming behind the pickup truck cab.

Additional benefits include:
a) Allowing a cross bar to be closer to the pickup truck cab in the closed position to minimize the gap between the cross bar and the pickup truck cab to further reduce aerodynamic drag;
b) Allowing folding from the closed position to the open position without having to disconnect the sides of outer cover from front and rear frames;
c) Lighter weight and less expensive to manufacture and ship than other prior art references;
d) Easily folds into an open position which allows full access to the pickup truck bed to allow for loading large cargo without having to fully remove or disassemble the aerodynamic cover;
e) Allows fast and easy removal from host pickup truck; and,
f) Protecting cargo from theft and the elements.

BRIEF DESCRIPTION OF THE SEVERAL VIEWS OF THE DRAWINGS

Drawings—Figures

FIG. 1 shows a perspective view of a foldable, aerodynamic cover installed and in the full closed position.

FIG. 2 shows a side view of a foldable, aerodynamic cover installed and in the full closed position.

FIG. 4 shows a perspective view of a framework of a foldable, aerodynamic cover installed and in a partially open position.

FIG. 5 shows a side view of a framework of a foldable, aerodynamic cover installed and in a partially open position.

FIG. 6 shows a perspective view of a framework of a foldable, aerodynamic cover installed and in the full open position.

FIG. 11 shows a side view of a framework of a foldable, aerodynamic cover in the full closed position in accordance with another embodiment.

FIG. 12 shows a side view of a framework of a foldable, aerodynamic cover in the full closed position in accordance with another embodiment.

FIG. 13 shows detail view of the rear frame to front support bar swinging pivot point in accordance with another embodiment.

FIG. 14 shows an isometric view of the rear frame in accordance with another embodiment.

DRAWINGS—REFERENCE NUMERALS

1 Foldable, Aerodynamic Cover
2 Framework
3 Outer Covering
4 Outer Covering Window
5 Rear Frame Window
6 Front Support Bar
7 Cross Bar
8 Rear Frame
9 Central Pivot Point
10 Lift Bar
11 Front Frame
12 Front Connecting Bar
13 Rear Frame To Front Support Bar Swinging Pivot Point
14 Front Frame To Lift Bar Pivot Point
15 Lift Bar To Front Support Bar Pivot Point
16 Means To Hold Rear Frame To Bed Of Pickup Truck
17 Means To Clamp Front Frame To Bed Of Pickup Truck
18 Means To Connect Outer Covering
19 Support Cable
20 Front Support Arm
21 Rear Support Arm
22 Front Support Arm to Crossbar Pivot Point
23 Front Support Arm to Rear Support Arm Pivot Point
24 Rear Support Arm to Rear Frame Pivot Point
25 Front Secondary Support Bar
26 Rear Secondary Support Bar
27 Front Secondary Cross Bar
28 Rear Secondary Cross Bar
29 Secondary Support Bar Central Pivot Point
30 Secondary Support Bar to Front Support Bar Pivot Point
31 Secondary Support Bar to Rear Frame Pivot Point
32 Pull Cable
33 Outer Covering Attachment

DETAILED DESCRIPTION OF THE INVENTION

Figure 3:
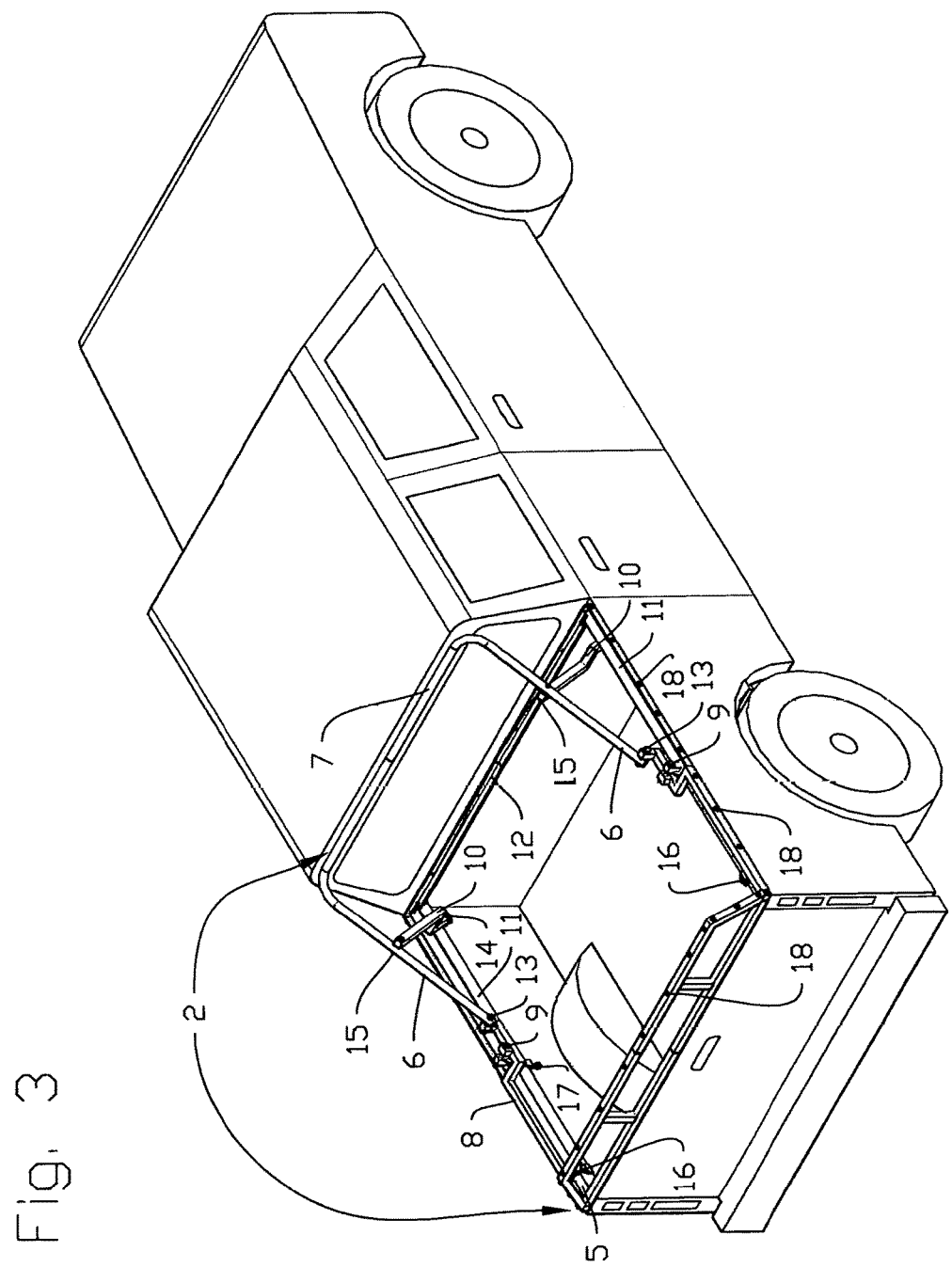
FIG. 3 shows a perspective view of a framework of a foldable, aerodynamic cover installed and in the full closed position.

FIGS. 1,2,3—First Embodiment

One embodiment of a foldable, aerodynamic cover 1 can be illustrated in FIG. 1 (perspective view) and FIG. 2 (side view). As shown in FIG. 1, the foldable, aerodynamic cover 1 can be installed on a pickup truck and can be in a full closed position. Said foldable, aerodynamic cover 1 can include, but is not limited to, a framework 2 and an outer covering 3. These views show said foldable, aerodynamic cover 1 which can include an outer covering 3 which is preferably made of a durable and flexible material, which can included one or more outer covering windows 4 which can be made of transparent material, such as vinyl. Said outer covering 3 can be supported by a framework 2 show in subsequent Figs.

Said outer covering 3 from FIG. 1 & FIG. 2 can be connected to a rear frame 8, a front frame 11 and a front connecting bar 12 (shown in FIG. 3) by a means to connect outer covering 18. Said means to connecting outer covering 18 could include, without limitation, various prior art including snaps, buttons, Velcro or screws.

FIG. 3 shows said framework 2 for said foldable, aerodynamic cover 1 which can be installed on a pickup truck and can be in a full closed position. In this Fig, said foldable, aerodynamic cover 1 is shown without said outer covering 3 and only said framework 2 is shown. Said framework 2 can include, but is not limited to, a rear frame 8, a central pivot point 9, a rear frame to front support bar swinging pivot point 13, a plurality of front support bars 6 and at least one cross bar 7. Said cross bar 7 can be connected to said front support bars 6. Said front support bars 6 can be pivotally connected to said rear frame 8 at the rear frame to front support bar swinging pivot point 13. When said foldable, aerodynamic cover 1 is in the full closed position, said rear frame 8 can be held against the bed rails of the pickup truck by a means to hold rear frame to bed of pickup truck 16, which can include a clamp or u-shaped hooks that hook under the lip of the pickup truck bed rails. The height of the vertical portion of said rear frame 8 can be dictated by the pickup truck cab height, pickup truck bed length and the optimal aerodynamic angle of said foldable, aerodynamic cover 1. Said rear frame 8 may include a rear frame window 5. In some cases, said rear frame 8 may not have a vertical portion at the back. Said rear frame 8 may be pivotally connected to said front frame 11 at a central pivot point 9. Said front frame 11 can be mounted on the bed rails of the pickup truck and can held down by a means to clamp front frame to the bed of pickup truck 17, which can include known prior art including, without limitation, c-clamps, screws or nuts and bolts. Lift bars 10 can be pivotally mounted to said front frame 11 at the front frame to lift bar pivot point 14. The other end of said lift bars 10 can be pivotally mounted to said front support bars 6 at the lift bar to front support bar pivot point 15. Said front frames 11 can be connected together by a front connecting bar 12.

FIGS. 3, 4, 5, and 6—Operation

FIG. 3 shows said framework 2 of said foldable, aerodynamic cover 1, which can be in a full closed position. In this position said foldable, aerodynamic cover 1 can reduce the aerodynamic drag of the pickup truck that it is mounted on. To transform said foldable, aerodynamic cover 1 into an open position, said means to hold rear frame to bed of pickup truck 16 can be released. As shown in FIG. 4 & FIG. 5, said rear frame 8 may rotate around said central pivot point 9 towards the cab of the pickup truck. Said rear frame to front support bar swinging pivot point 13 can rotate around said central pivot point 9 and said front support bars 6 can move down and back. As said front support bars 6 moves down and back, said lift bars 10 can rotate towards the back of the pickup truck, around said front frame to lift bar pivot point 14. FIG. 6 shows said framework 2 of said foldable, aerodynamic cover 1, which can be in a full open position which may allow large cargo to be placed in the bed of the pickup truck.

FIGS. 7,8,9,10,11,12,13, and 14—Alternative Embodiments

Figure 7:
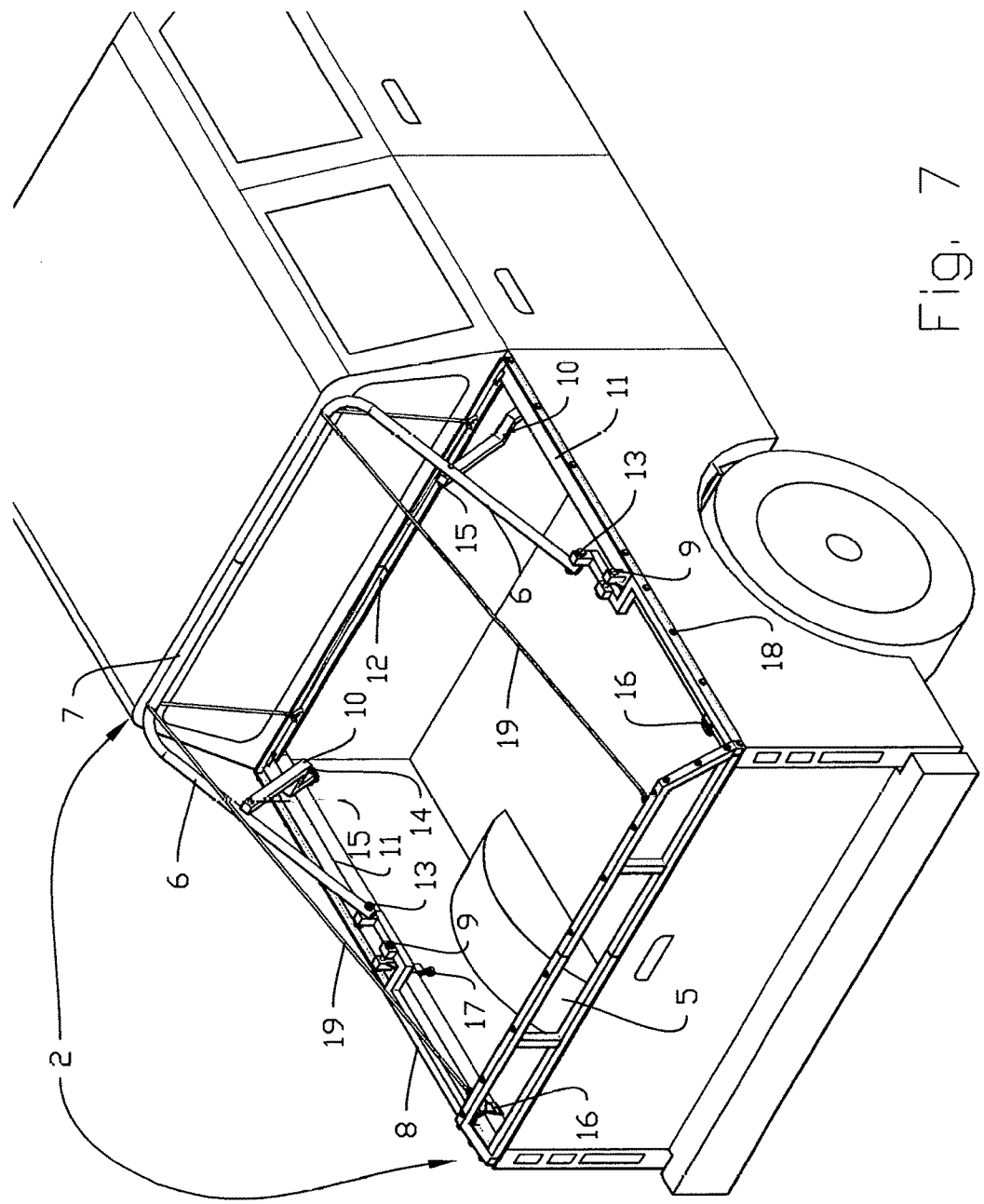
FIG. 7 shows a perspective view of a framework of a foldable, aerodynamic cover installed and in the full closed position in accordance with another embodiment.

There are various possibilities with regards to the method of supporting said outer covering 3. FIG. 7 shows said framework 2 of said foldable, aerodynamic cover 1, which can have an addition of a plurality of support cables 19 that may be connected to said front connecting bar 12, may go over or through said cross bar 7 and may be connected to said rear frame 8.

Figure 8:
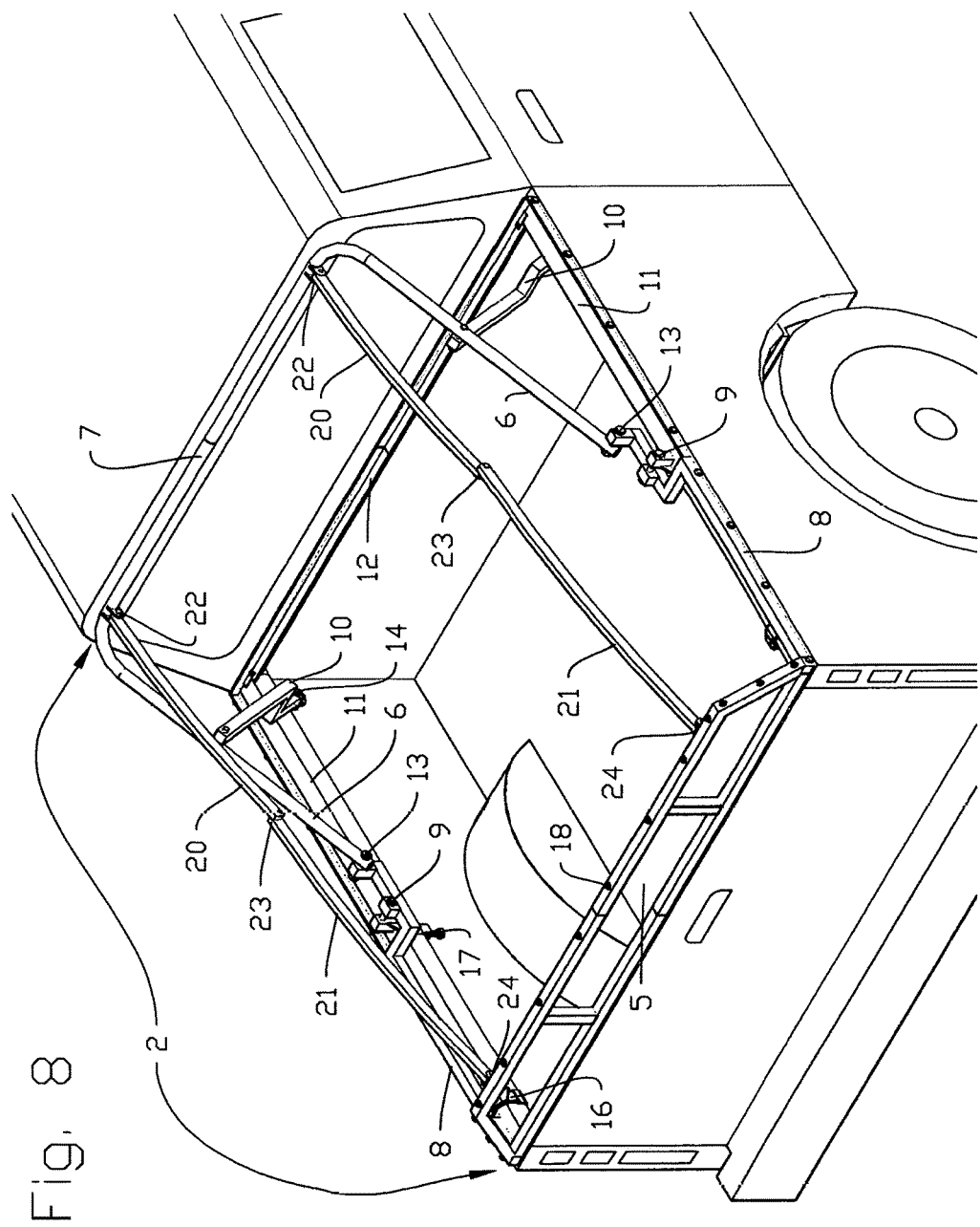
FIG. 8 shows a perspective view of a framework of a foldable, aerodynamic cover installed and in the full closed position in accordance with another embodiment.

FIG. 8 shows said framework 2 for said foldable, aerodynamic cover 1, which can have a plurality of front support arms 20 and rear support arms 21 as a method of supporting the outer covering 3. Said front support arms 20 can be pivotally connected to said cross bar 7 at a front support arm to crossbar pivot point 22. Said rear support arms 21 can be pivotally connected to said rear frame 8 at a rear support arm to rear frame pivot point 24. Said front support arms 20 and rear support arms 21 can be pivotally connected to each other at a front support arm to rear support arm pivot point 23.

Figure 9:
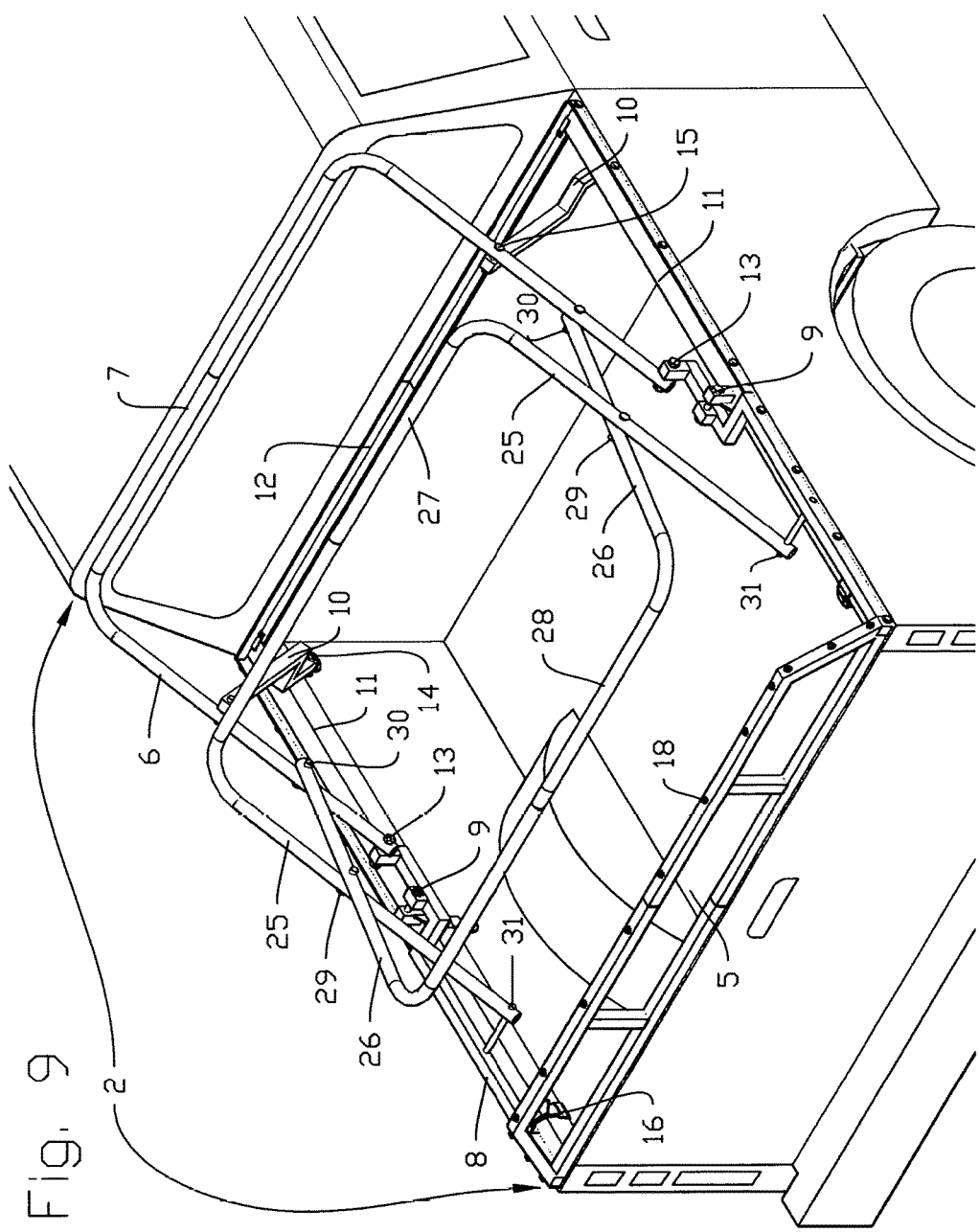
FIG. 9 shows a perspective view of a framework of a foldable, aerodynamic cover installed and in the full closed position in accordance with another embodiment.
Figure 10:
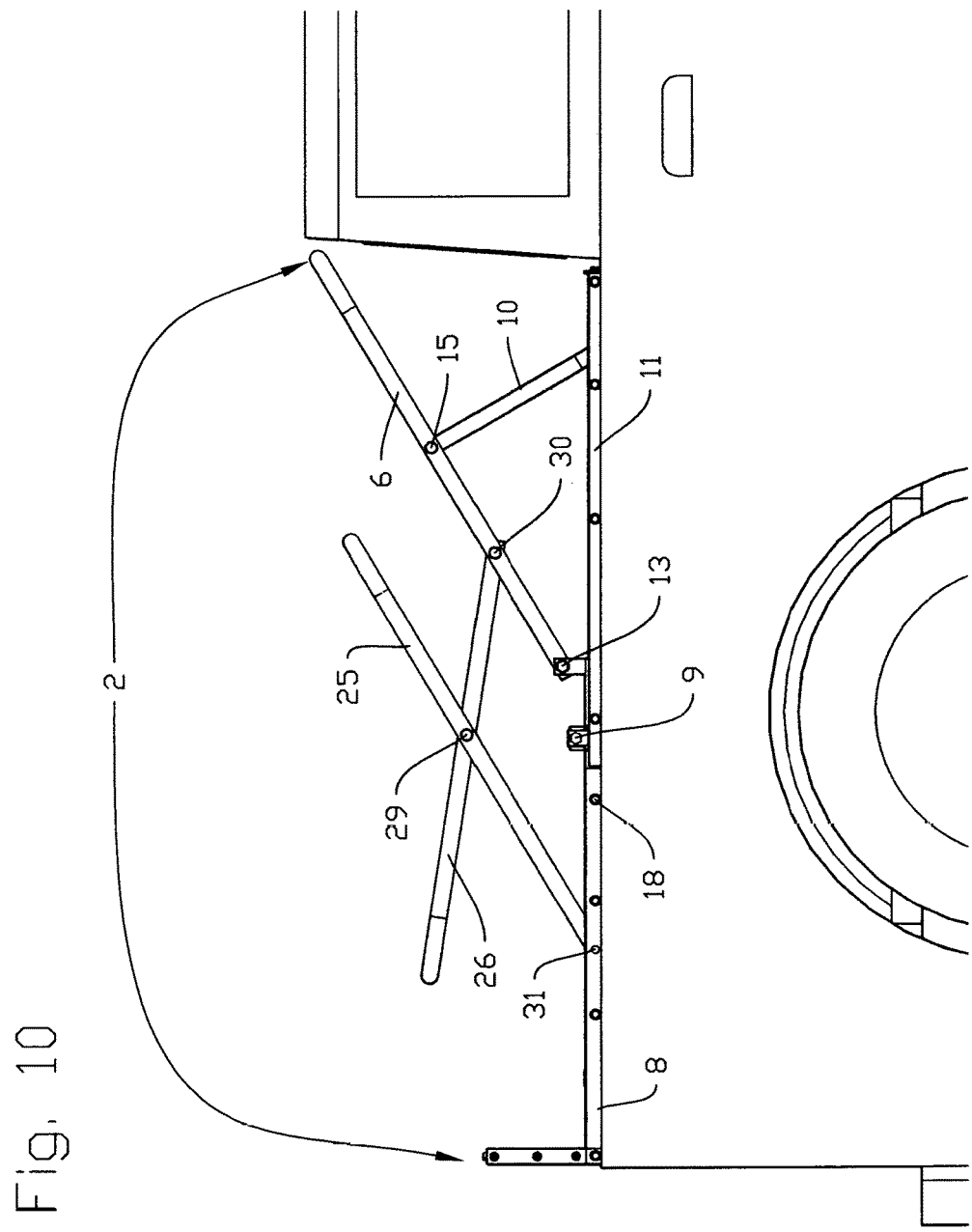
FIG. 10 shows a side view of a framework of a foldable, aerodynamic cover shown in FIG. 9. The cover is installed and in the full closed position.

Another possibility for supporting the outer covering would be the addition of a plurality of secondary support bars and cross bars. FIG. 9 & FIG. 10 shows said framework 2 for said foldable, aerodynamic cover 1, which can include a plurality of front secondary support bars 25, rear secondary support bars 26, front secondary cross bar 27 and rear secondary cross bar 28. Said front secondary support bar 25 can be connected to said front secondary cross bar 27 and pivotally connected to said rear frame 8 at a secondary support bar to rear frame pivot point 31. Said rear secondary support bar 26 can be connected to said rear secondary cross bar 28 and pivotally connected to said front support bar 6 at a secondary support bar to front support bar pivot point 30. Said front secondary support bar 25 and said rear secondary support bar 26 can be pivotally connected to each other at a secondary support bar central pivot point 29.

FIGS. 11, 12 & 13 show possible embodiments where said front support bars 6 can be pulled into position without the need for said lift bars 10 shown in previous embodiments.

The embodiment in FIG. 11 shows the addition of a pull cable 32. One end of said pull cable 33 can be connected to said cross bar 7 and the other end can be connected to said rear frame 8. As said foldable, aerodynamic 1 cover goes from an open to a closed position and said rear frame 8 may rotate around said central pivot point 9, said rear fame 8 may pull said pull cable 32, which may then pull said cross bar 7, which may cause said front support bar 6 to rotate around said rear frame to front support bar swinging pivot point 13, which may bring said front support bars 6 into position.

The embodiment in FIG. 12 shows the possible addition of an outer covering attachment 33. Said outer covering attachment 33 may be a sleeve sewn into said outer covering 3, which may wraparound said cross bar 7. As said foldable, aerodynamic cover 1 goes from an open to a closed position and said rear frame 8 may rotate around said central pivot point 9, said rear frame 8 may pull said outer covering 3 which may allow said outer covering attachment 33 to pull said cross bar 7, which may cause said front support bar 6 to rotate around said rear frame to front support bar swinging pivot point 13, which may bring said front support bars 6 into position.

The embodiment in FIG. 13 shows a possible reconfiguration of said rear frame 8, said front support bar 6 and said rear frame to front support bar swinging pivot point 13. As the foldable, aerodynamic cover 1 goes from an open to a closed position and said rear frame 8 may rotate around said central pivot point 9, said front support bar 6 may rotate around said rear frame to front support bar swinging pivot point 13 until the bottom of said front support bar 6 may rest on top of said back frame 8, which can then push said front support bar 6 into position.

The embodiment in FIG. 14 shows a possible reconfiguration of said rear frame 8, which may have no vertical portion at the back and said means to connect outer covering 18, which may be attached to the sides and the back of said rear frame 8.

CONCLUSION, RAMIFICATIONS AND SCOPE

Accordingly, the reader will see that the foldable aerodynamic cover of the various embodiments create an aerodynamic shape over the bed of a pickup truck, is lightweight and inexpensive to manufacture and folds easily between an open and closed position. Additionally, the various embodiments show that the foldable aerodynamic cover allows full access to the pickup truck bed to load large cargo when the cover is in the open position.

Although the description above contains many specificities, these should not be construed as limiting the scope of the embodiments but rather as merely providing illustrations of some of several embodiments. For example, the front frame and central pivot point can be incorporated into the bed of the pickup truck; the lift bars could mount directly to the sides of the pickup truck bed; the outer covering could attach directly to the cross bar; the front support bars can have other shapes such as square, oval, etc.; the rear frame could be flat with no vertical section to house the rear frame window; when in the open position, the cross bar could be in front of the rear frame; etc. Additionally, the foldable aerodynamic cover can be designed to fit on any pickup truck with any bed length or width and pickup trucks various cab configurations including single cab, double cab, extra cab, etc.

Thus the scope of the embodiments should be determined by the appended claims and their legal equivalents, rather than by the examples given.

What is claimed is:

1. A pickup truck bed cover comprising;
   a. an outer covering; and
   b. a foldable frame comprising a plurality of rigid support members;
   whereby said foldable frame supports said outer covering to create a shape which starts at approximately a height of a cab of a pickup truck and tapers downward towards a tailgate of said pickup truck, and wherein said foldable frame and said outer covering fold to an open position such that said rigid support members and said outer covering are adjacent to said pickup truck's cab to provide access to a bed of said pickup truck.

2. The pickup truck bed cover of claim 1, wherein sides of said pickup truck bed cover approximately follow the angle of sides of said pickup truck cab at the front and angle inwards towards a centerline of said pickup truck at a back.

3. The pickup truck bed cover of claim 1, wherein said outer covering is connected to one of said plurality of rigid support members, goes up over another of said plurality of rigid support members and connects to a rear one of said plurality of rigid support members.

4. A back frame for a pickup truck bed cover which rest on rails of a bed of said pickup truck and curves inward into a space between said rails to connect to one or more central pivot points and front support bars.

5. The back frame of claim 4, further comprising a vertical section which rests on a tailgate of said pickup truck to which an outer covering can be attached and can include a rear frame window.

* * * * *